US009658853B2

(12) United States Patent
Barowski et al.

(10) Patent No.: US 9,658,853 B2
(45) Date of Patent: May 23, 2017

(54) TECHNIQUES FOR INCREASING INSTRUCTION ISSUE RATE AND REDUCING LATENCY IN AN OUT-OF ORDER PROCESSOR

(71) Applicant: GLOBALFOUNDRIES INC, Grand Cayman (KY)

(72) Inventors: Harry Barowski, Boeblingen (DE); Tim Niggemeier, Laatzen (DE)

(73) Assignee: GLOBALFOUNDRIES INC, Grand Cayman (KY)

( * ) Notice: Subject to any disclaimer, the term of this patent is extended or adjusted under 35 U.S.C. 154(b) by 261 days.

(21) Appl. No.: 14/448,790

(22) Filed: Jul. 31, 2014

(65) Prior Publication Data

US 2015/0039862 A1 Feb. 5, 2015

(30) Foreign Application Priority Data

Aug. 2, 2013 (GB) .................................. 1313825.0

(51) Int. Cl.
 G06F 9/30 (2006.01)
 G06F 9/38 (2006.01)
 G06F 5/14 (2006.01)

(52) U.S. Cl.
 CPC ........ *G06F 9/3012* (2013.01); *G06F 9/30145* (2013.01); *G06F 9/3826* (2013.01);
 (Continued)

(58) Field of Classification Search
 CPC .. G06F 9/3012; G06F 9/30145; G06F 9/3857; G06F 5/14; G06F 9/3859; G06F 9/3826; G06F 9/30043

(Continued)

(56) References Cited

U.S. PATENT DOCUMENTS 6,101,596 A * 8/2000 Tanaka ................. G06F 9/3824
 712/210
6,421,698 B1* 7/2002 Hong ........................ G06T 1/20
 708/490

(Continued)

FOREIGN PATENT DOCUMENTS

WO 2012003997 A1 1/2012

OTHER PUBLICATIONS

Ram Rangan, "Pipelined Multithreading Transformations and Support Mechanisms", A dissertation submitted in Jun. 2007 URL:http://liberty.princeton.edu/Publications/phdthesis_ram.pdf.

(Continued)

*Primary Examiner* — Daniel Pan
(74) *Attorney, Agent, or Firm* — Scully Scott Murphy and Presser; Frank Digiglio (57) ABSTRACT

A technique for operating a processor includes storing a first result to a writeback buffer, in response to a first execution unit of the processor attempting to write the first result of a first completed instruction to a register file of the processor at a same processor time as a second execution unit of the processor is attempting to write a second result of a second completed instruction to the register file. The writeback buffer is positioned in a dataflow between the first execution unit and the register file. A buffer full indicator logic is used to detect that the writeback buffer is unavailable. A buffer unavailable signal is transmitted, from the buffer full indicator logic, in response to detecting the writeback buffer is unavailable. In response to receiving the buffer unavailable signal, a buffer retrieving logic writes the first result from the writeback buffer to the register file.

19 Claims, 7 Drawing Sheets

(52) U.S. Cl.
CPC .............. *G06F 9/3857* (2013.01); *G06F 5/14* (2013.01); *G06F 9/30043* (2013.01)

(58) Field of Classification Search
USPC ........................................... 712/218; 710/57
See application file for complete search history.

(56) References Cited

U.S. PATENT DOCUMENTS

| | | | |
|---|---|---|---|
| 7,478,225 | B1 | 1/2009 | Brooks et al. |
| 7,539,789 | B1* | 5/2009 | Ogden .................... G06F 5/065 365/189.011 |
| 8,145,848 | B2 | 3/2012 | Jain et al. |
| 2002/0083253 | A1* | 6/2002 | Leijten ................ G06F 9/30116 710/260 |
| 2011/0087866 | A1 | 4/2011 | Shah et al. |

OTHER PUBLICATIONS

Brown, M.D., "Select-Free Instruction Scheduling Logic", Micro architecture, 2001. Micro-34. Proceedings. 34th ACM/IEEE International Symposium, Dec. 1-5, 2001 URL:http://ieeexplore.ieee.org/xpl/login.jsp?tp=&arnumber=991119
&url=http%3A%2F%2Fieeexplore.ieee.org%2Fxpls%2Fabs_all.jsp%3Farnumber%3D991119.
Ip.com, "Method and Apparatus for the Optimization of Store Write-Back Latency in a Microprocessor", Ip.com Disclosure No. IPCOM000213189D Publication, Dec. 7, 2011 URL: http://ip.com/IPCOM/000213189.

* cited by examiner

TECHNIQUES FOR INCREASING INSTRUCTION ISSUE RATE AND REDUCING LATENCY IN AN OUT-OF ORDER PROCESSOR

This application claims priority to United Kingdom Patent Application 1313825.0, entitled "INCREASED INSTRUCTION ISSUE RATE AND LATENCY REDUCTION FOR OUT-OF-ORDER PROCESSING BY INSTRUCTION CHAINING AND COLLISION AVOIDANCE," filed on Aug. 2, 2013. The disclosure of United Kingdom Patent Application 1313825.0 is hereby incorporated herein by reference in its entirety for all purposes.

BACKGROUND

The present disclosure is generally directed to techniques for increasing instruction issue rate and reducing latency and, more specifically, to techniques for increasing instruction issue rate and reducing latency for an out-of-order processor by instruction chaining and collision avoidance.

Modern processors are often operated by using an out-of-order (OoO) sequencing of instructions in order to improve the performance of the processor. Since in modern multithreaded processors instructions with different execution latencies are issued out of sequence of an instruction queue and results are written back into a register file with limited writeback ports, the issue sequence must reflect writeback resource constraints. In particular, if an instruction is issued for execution and will complete after 'n' execution cycles and another instruction, which may complete in 'm' (<'n') cycles, would be issued m-n cycles later, both instructions would writeback into the register file concurrently and, thus, collide.

A first conventional approach has delayed issuance of the short latency instruction if another instruction with 'k' cycle latency, wherein 'k' is not equal to 'm', is ready for issuance. A second conventional approach has treated the short latency instruction as an instruction with 'n' cycle latency to eliminate the resource writeback conflict. A disadvantage of the first conventional approach is that any older short instructions cannot be issued since longer latency instructions will get a higher priority resulting in a stall condition. A disadvantage of the second conventional approach is that back-to-back latency is increased which might cause reduced throughput and reduce power efficiency.

U.S. Pat. No. 7,478,225 discloses an apparatus and method to support pipelining of variable latency instructions in a multithreaded processor. In one embodiment, a processor may include instruction fetch logic configured to issue a first and second instruction from different ones of a plurality of threads during successive cycles. The processor may also include first and second execution units respectively configured to execute shorter latency and longer latency instructions and to respectively write shorter latency or longer latency instruction results to a result write port during a first or second writeback stage. The first writeback stage may occur a fewer number of cycles after instruction issue than the second writeback stage. The instruction fetch logic may be further configured to guarantee a result write port access by the second execution unit during the second writeback stage by preventing the shorter latency instruction from issuing during a cycle for which the first writeback stage collides with the second writeback stage.

U.S. Patent Application Publication No. 2011/0087866 discloses a multi-threaded microprocessor. The multi-threaded microprocessor includes an instruction fetch unit including a perception-based conditional branch prediction unit configured to provide, for each of one or more concurrently executing threads, a direction branch prediction. The conditional branch prediction unit includes a plurality of storages, each including a plurality of entries. Each entry may be configured to store one or more prediction values. Each prediction value of a given storage may correspond to at least one conditional branch instruction in a cache line. Thus, later instructions may execute before a given instruction completes, which may improve overall performance of the executing thread. Unfortunately, the problem of conflicting parallel executed instructions that need to writeback to a register file is not overcome without delaying instructions in one way or the other, degrading overall performance of a processor.

BRIEF SUMMARY

Disclosed are a method, a data processing system, and a computer program product (embodied in a computer-readable storage device) for operating an out-of-order processor.

A technique for operating a processor includes storing a first result to a writeback buffer of the processor, in response to a first execution unit of the processor attempting to write the first result of a first completed instruction to a register file of the processor at a same processor time as a second execution unit of the processor is attempting to write a second result of a second completed instruction to the register file. The writeback buffer is positioned in a dataflow between the first execution unit and the register file. A buffer full indicator logic is used to detect that the writeback buffer is unavailable. A buffer unavailable signal is transmitted, from the buffer full indicator logic, in response to detecting the writeback buffer is unavailable. In response to receiving the buffer unavailable signal at a buffer retrieving logic, the buffer retrieving logic writes the first result from the writeback buffer to the register file.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The illustrative embodiments provide a method, a data processing system, and a computer program product (embodied in a computer-readable storage medium) for operating an out-of-order processor.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be utilized herein, the term 'coupled' encompasses a direct electrical connection between components or devices and an indirect electrical connection between components or devices achieved using one or more intervening components or devices.

According to one embodiment, a processor includes a writeback buffer in a dataflow between an execution unit and a register file of the processor. The writeback buffer is adapted to store (in particular, steer and store) a result of a first completed instruction of the execution unit when the first completed instruction may attempt to writeback to the register file at the same processor time (in particular processor cycle) as a second completed instruction of another execution unit. The processor may also include an instruction scheduling unit that further includes a buffer full indicator logic (in particular, a writeback buffer full indicator logic), a buffer retrieving logic (in particular, a writeback buffer retrieving logic), and a merging logic. The buffer full indicator logic may be adapted to detect that the writeback buffer is occupied.

In particular, the buffer full indicator logic may, or may not, be in data exchange with the writeback buffer. The instruction scheduling unit may keep track of the status of the writeback buffer. The buffer retrieving logic may be adapted to writeback an execution unit instruction result from the writeback buffer (in particular, to the register file) in response to a signal from the buffer full indicator logic. The merging logic may be adapted to detect and combine a first execution unit instruction of a processor instruction stream with a subsequent second execution unit instruction of the processor instruction stream into an instruction pair if the second execution unit instruction has an input data dependency to a result of the first execution unit instruction. For example, the merging logic may detect instruction pairs by inspecting younger execution unit instructions in the processor instruction stream than the first execution unit instruction that will overwrite a destination (target) register of the first execution unit instruction. In particular, the result of the first execution unit instruction may not be required at any other place within or outside the processor.

The processor may also include an instruction sequencing unit that includes a pair detection logic and a pair issuing logic. The pair detection logic may be adapted to detect that the first execution unit instruction, which is ready for issue, is paired with the second execution unit instruction. The pair issuing logic may be adapted, responsive to a signal of the pair detection logic, to issue the first and the second execution unit instructions as paired execution unit instructions (in particular, one after the other).

According to another embodiment, a method to operate a processor with out-of-order instruction processing may include providing a writeback buffer in a dataflow between an execution unit and a register file of the processor. The writeback buffer stores a result of a first completed instruction of the execution unit when the first completed instruction may attempt to writeback to the register file at the same processor time as a second completed instruction of another execution unit. The method may also comprise operating an instruction scheduling unit that includes a buffer full indicator logic, a buffer retrieving logic, and a merging logic. The buffer full indicator logic may detect that the writeback buffer is occupied. The buffer retrieving logic may writeback an execution unit instruction result from the writeback buffer in response to a signal from the buffer full indicator logic.

The merging logic may detect and combine a first execution unit instruction of a processor instruction stream with a subsequent second execution unit instruction of the processor instruction stream to an instruction pair if the second execution unit instruction has an input data dependency to a result of the first execution unit instruction. For example, the merging logic may detect instruction pairs by inspecting younger execution unit instructions in the processor instruction stream than the first execution unit instruction that may overwrite a destination (target) register of the first execution unit instruction. The method may additionally comprise operating an instruction sequencing unit comprising a pair detection logic and a pair issuing logic. The pair detection logic may detect that the first execution unit instruction, which may be ready for issue, may be paired with the second execution unit instruction. The pair issuing logic, responsive to a signal of the pair detection logic, may issue the first and the second execution unit instruction as paired execution unit instructions. The execution unit instructions may be executed in a direct sequence.

It should be noted that the processor instruction stream may not be executed by only one execution unit. That is, several execution units may work in parallel such that the processor instruction stream may be executed by different execution units (e.g., of different type that are optimized for different tasks). As used herein, the term "out-of-order instruction processing" denotes processing of instructions in a processor that may not reflect the strict order of instruction from a program being executed. For example, optimization on a hardware level may lead to a different order of instruction compared with a related program. This may allow an optimization of the way the program may be executed. As a result, the processor may execute the program faster out-of-order than in-order. The term "writeback" as used herein denotes a process of writing back a result from an execution unit to a register file. The term "writeback buffer" may denote a buffer adapted to store a result of an execution unit of a processor that would (under prior art conditions) be written directly back to the register file of the execution unit.

According to one aspect of the present disclosure, the result may not be written back directly to the register file, but may temporally be stored in the writeback buffer. The term "execution unit" denotes a part of a central processing unit (CPU) that performs operations and calculations. Several execution units may be combined into a larger execution unit, e.g., a so-called vector scalar unit (VSU). In general, a VSU may include an internal control sequencing unit, registers, and other internal units. The execution units may have different types, such as an arithmetic logical unit (ALU) or a floating point unit (FPU), or some smaller, more specific components like a simple unit for logical operations and a permute unit. All these execution units may be operated in parallel within a larger execution unit (e.g., a VSU). The term "register file" denotes a staged input buffer with multiple entries, i.e., an array of entries, building an input side of a group of execution units that may operate in parallel. The term "processor time" denotes a time within a processor. Typically, processor time measurement may be performed or may be related to processor cycles.

The term "instruction scheduling unit" or instruction scheduler denotes a unit adapted to schedule instruction issuance. The instruction scheduler may further be adapted to improve instruction-level parallelism, which may improve performance on processors with instruction pipelines. Put more simply, without changing the meaning of the code, the instruction scheduler may try to avoid pipeline stalls by re-arranging the order of instructions and may avoid illegal or semantically ambiguous operations (typically involving subtle instruction pipeline timing issues or non-interlocked resources). The term "buffer full indicator logic" denotes a unit adapted to signal that a related buffer, in particular a writeback buffer, may be occupied, i.e., may not be overwritten. The term "buffer retrieving logic" denotes logic that may be adapted to writeback an execution unit instruction result from the writeback buffer to the register file. Writeback may happen in response to a signal from a buffer full indicator logic. In a multiple entry writeback buffer, an instruction scheduling unit may not be able (at least not without additional circuitry) to track at every moment in time the status of the writeback buffer entries. An instruction scheduling unit may be able to readily track a status of a writeback buffer with a single entry. In one or more embodiments, the buffer full indicator logic may signal that all entries in the writeback buffer are occupied, i.e., waiting for a writeback to a corresponding entry in the register file.

The term "merging logic" denotes logic that may be designed or adapted to detect and combine a first execution unit instruction of a processor instruction stream with a subsequent second execution unit instruction of the processor instruction stream into an instruction pair. Combining may be dependent on a data dependency of the input of the second execution unit instruction from the first execution unit instruction. The merging logic may operate by inspecting younger execution unit instructions in the processor instruction stream than the first execution unit instruction that will overwrite a destination (target) register of the first execution unit instruction. Combining may also occur if two instructions are independent from each other and a result of the first instruction is not required in any architectural state of the processor. The term "instruction pair" may denote a sequence of two instructions, e.g., instructions being of a short latency type, that may be executed one after the other. The first instruction may not writeback any result from its execution to the register file.

An instruction pair may also be denoted as an instruction chain because the instructions may be viewed as chained. An instruction pair may be executed on the same execution unit. The term "younger execution unit instruction" denotes an instruction that may be issued later in time than an older execution unit instruction. The term "pair detection logic" denotes logic that detects that instructions (e.g., typically, two instructions of the short latency type) may be eligible for a pairing or chaining. The term "pair issuing logic" denote logics that may enable issuance of paired instructions. The pair issuing logic may be linked to the pair detection logic in a way that if the pair detection logic detects instructions that may be eligible for pairing, the pair issuing logic may issue the related instructions in a direct sequence. However, the issue signals may be separate and different in time.

Once the pair detection logic may have detected an instruction pair, the pair issuing logic may set a flag when issuing the first instruction of the pair that after the end of the first instruction the second instruction of the pair has to be issued immediately. The term "architectural state" may denote a status of a processor that is defined by its architecture and manifests itself in operation result registers (e.g., control registers, instruction flag registers, interrupt mask registers, memory management unit registers and status registers, as well as general purpose registers, adder registers, address registers, counter registers, index registers, stack registers, and the like). However, the architectural state may not include internal register values of execution units that may not be directly and individually accessible by processor instructions.

The term "short instruction" denotes an instruction requiring only a low number processor cycles (e.g., one, two, or three cycles). Short instructions may be compared with long instructions. Short instructions may be of a short latency type. The term "long instruction" may be seen as the contrast to short instructions. Long instructions may require a larger number of processor cycles to complete (e.g., six, seven, or even more processor cycles). Long instructions may be of a long latency type.

A processor configured according to the present disclosure to perform out-of-order instruction processing provides numerous advantages. As one example, the writeback buffer in the dataflow between the execution unit and the register file of the execution unit may have the advantage that parallel executed instructions having different latency (i.e., required execution cycles) and finishing at the same time would not cause a writeback conflict to the register file. One of the two partial results (i.e., a result from one of the parallel executed instructions) may be buffered in the writeback buffer. The buffered result may then be transferred to the register file after the other result of the parallel executed instruction has been further processed (i.e., sent to the register file). Thus, if a long instruction is issued m-n cycles (where 'm' is the cycle number of a long instruction and 'n' is the cycle number of a short instruction) before a short instruction and both instructions complete at the same processor time the writeback conflict may be resolved by steering one result into the writeback buffer. The other result of the other execution unit may follow a writeback path to the register file.

The buffered result may be written back to the register file when the writeback path is unused and (at the same time) the instruction completion or finish indication may be sent to the instruction scheduling unit. The instruction scheduling unit may also determine whether the buffer is occupied or not, e.g., by depending on the finish indication. Alternatively, the scheduling unit may mimic the buffer behavior. A more complex and flexible solution may allow a multi-stage writeback buffer and imply additional communication between the scheduling unit and the execution units, e.g., via "buffer full" and "finish" indications.

The writeback buffer may need at least 'l' entries, where 'q' defines the communication latency, i.e., turn-around time between the execution unit and the scheduling unit. The concept being that an issue of a short instruction may be delayed if no writeback buffer entry is available. Since the buffer full indication may influence the issue decision, the communication delay may define how many short instructions are already issued before the buffer full indication can prevent further issues of short instructions. The issue decision may show a behavior with hysteresis, such that only if at least 'q' entries are available in the writeback buffer the issue of short instructions may be restarted. Depending instructions using any result stored in the writeback buffer may be issued since the forwarding path may also bypass results from the buffer via a content addressable memory concept. A possible buffer full indication within an instruction scheduling unit for a single entry buffer may be based on a delay chain. In addition, by the instruction pairing mechanism certain short instructions may be treated and issued as pair if certain conditions are fulfilled.

The execution latency of an instruction pair may be increased and ideally may match the latency of a long latency instruction type. In this manner, it may be guaranteed that a pair of short instruction may be issued without a collision at writeback, since the results of any long type instruction and the pair of short instructions may be calculated at different cycles. Assuming the 'm' is equal to '2n', any pair of '2n' cycle latency instructions (short instructions) may have the same execution latency as a long instruction requiring 'm' cycles, and thus, the result will appear at the writeback port of the register file following the issue sequence. As a consequence of the instruction pairing, the throughput of instructions through the processor may be increased because the processing of paired instruction may become much easier because the risk of a conflict at writeback time from two parallel instructions streams of the execution unit (i.e., one from a long instruction and one from two paired short instructions) may be avoided by the writeback buffer.

According to one embodiment, a processor may comprise more than one execution unit. In general, throughput of a processor may be increased by parallel execution units. Execution units may be grouped to a larger execution unit, e.g., a vector scaling unit, so that the processor may operate on different instruction streams in parallel. According to one embodiment, the execution units may be of a different type. The types may include a fixed point unit, a floating point unit, a simple unit for logical operations, and/or a permute unit. In processors with different types of execution units, different types of instructions (which may require a different number of processor cycles) may be performed in parallel without influencing each other. According to one advantageous embodiment, the processor may comprise a multiplexer between the writeback buffer (in particular, an output side of the writeback buffer) and a related register (in particular, an input port of the register file). The multiplexer may selectively connect the output of the writeback buffer to the input port of the register file or, it may alternatively connect an output port of the second instruction unit with the input port of the register file.

According to an embodiment, the writeback buffer may have multiple entries to allow for more complex and dynamic operation of the writeback buffer. The latency executed instruction may be further reduced to increase the performance of a processor. According to one embodiment, the multiple entries may be organized as a first-in-first-out (FIFO) buffer. Organizing the multiple entries as a FIFO buffer, may allow a stringent operation of the processor because the oldest buffered results may be written back to the register file first. According to another embodiment, the multiple entries are organized as a ring buffer. Organizing the multiple entries as a ring buffer may allow more flexibility in operation. Additionally, a ring buffer may be more power efficient than a FIFO buffer. According to one embodiment, the writeback buffer with multiple entries may be adapted to define selected entries invalid based on a flush signal or data of the entries may be completely deleted. However, deleting the entries may be more time consuming and power intensive. Flushing may be necessary, for example, for a branch instruction when a wrong prediction is made. That is, results relating to wrong predictions may need to be flushed, e.g., marked invalid.

According to one embodiment, the merging logic may be adapted to detect and combine a first execution unit instruction of the processor instruction stream with a subsequent second execution unit instruction of the processor instruction stream into an instruction pair when the result of the first execution unit instruction does not appear as an architectural state of the processor after the second execution unit instruction may be completed. The term "combine" may denote sequencing or chaining of the execution unit instructions. The execution unit instructions may be issued and executed directly one after the other. An alternative to not appearing as an architectural state of the result of the first instruction may be a situation in which the result of the first instruction may not be required as an input value to any other unit and/or execution unit within the processor. Thus, the result may not be required for any future operation (e.g., a branch instruction, a store instruction, a jump instruction).

According to an embodiment, the first and second execution unit instructions may each be short instructions and a combined latency of the short instructions may match a latency of a long instruction. A "forward" of a result from the first short instruction to the second short instruction may also be taken into consideration.

Figure 1:
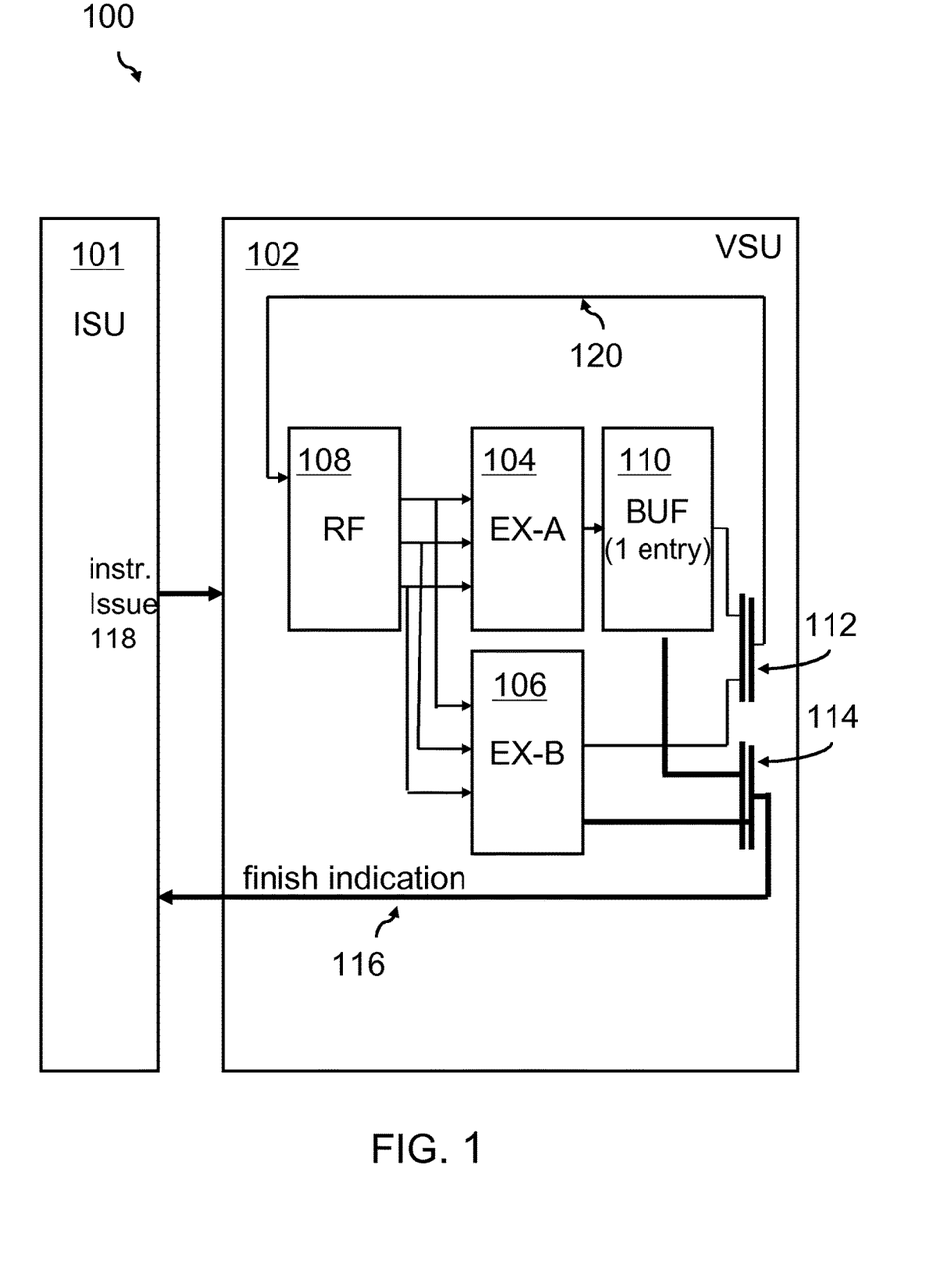
FIG. 1 is a block diagram of an out-of-order (OoO) processor that includes a writeback buffer with a single entry.

FIG. 1 shows a block diagram of an embodiment of elements of an OoO processor 100 that includes a writeback buffer 110. A vector scaling unit (VSU) 102 may be connected to an instruction scheduling unit (ISU) 101 via various signal lines. The vector scaling unit 102 may comprise at least two execution units (e.g., execution unit A 104 and execution unit B 106). More parallel execution units may be connected in parallel to execution unit 104 and execution unit 106. Input for the execution units 104 and 106 may come from a register file (RF) 108. The register file 108 may comprise an array of registers, storage elements or the like. Conventionally, outputs of execution unit 104 and execution unit 106 may be connected via multiplexer 112 to the register file 108 in order to feedback results from the execution units 104 and 106 into the processing stream of VSU 102.

The execution units 104 and 106 may, for example, include a floating point unit, a fixed point unit, a simple unit for logical operations and/or a permute unit. Other execution units may be possible. In contrast to conventional processors, a writeback buffer 110 may be provided in the dataflow from one execution unit (here execution unit 104) and the register file 108. Additionally, a finish indication 116 (to be fed back to the ISU 102) may be generated by the writeback buffer 110 and the execution unit 106. A second multiplexer 114 selects either of the two finish indications. However, the finish indication 116 lines may be optional and may only be required if the instruction scheduling unit 101 is not able to track the instructions directly. The instruction issue signal 118 from the instruction scheduling unit 101 to the vector scaling unit 102 and thus, to the execution units 104 and 106, is discussed below in the context of instruction pairing.

Figure 2:
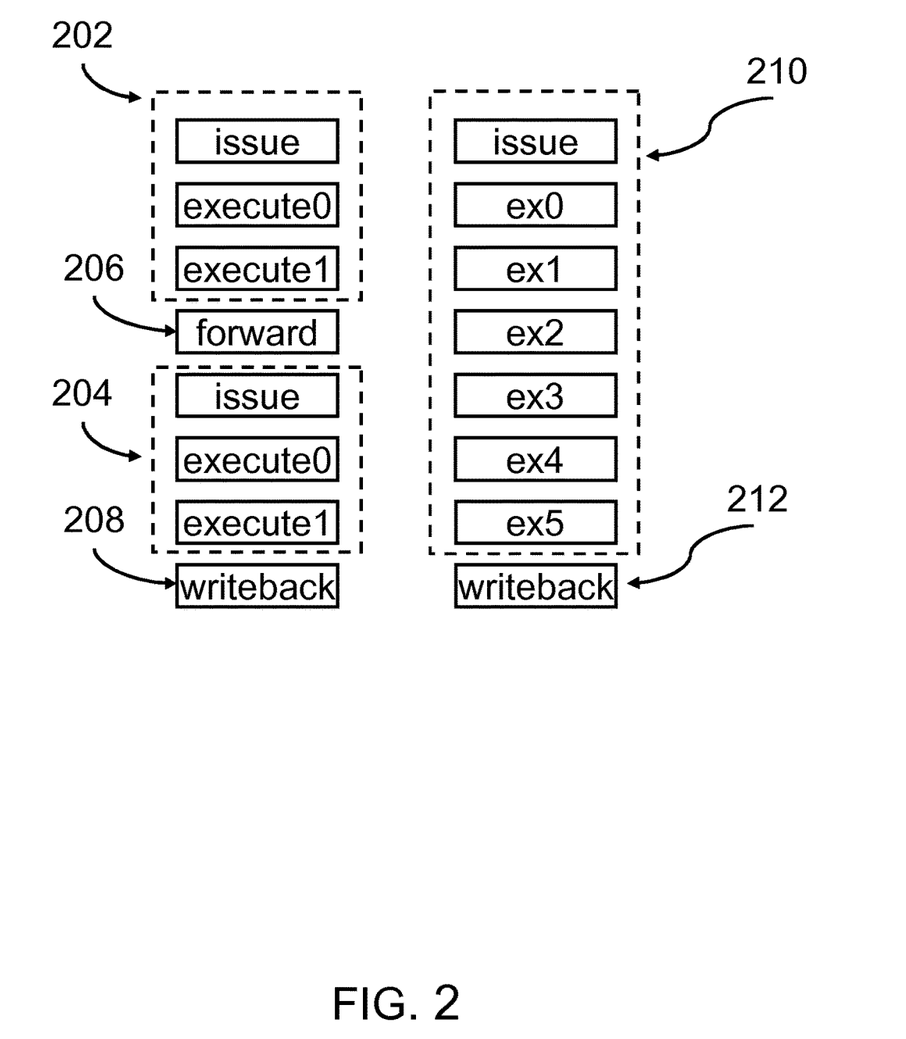
FIG. 2 symbolically shows two short instructions and one long instruction.

FIG. 2 shows symbolically two short and one long instruction. First short instruction 202 may require three cycles: issue, execute0, execute1. Examples of short instructions may be an ADD, a SHIFT or, an XOR instruction. A second short instruction 204 may require the same number of processor cycles: issue, execute0, execute1. The two short instructions 202 and 204 may depend on each other in that the short instruction 204 may require a result from the short instruction 202. In one additional cycle, a forwarding 206 may deliver the result of the short instruction 202 to the short instruction 204. A final writeback 208 of the result of the short instruction 204 may writeback a result into the register file 108. Thus, the two chained short instructions 202 and 204 including a writeback may require eight total processor cycles.

The long instruction 210 may require the following processor cycles: issue, ex0, ex1, ex2, ex3, ex4, ex5. In addition, a writeback 212 may be required. In this case, eight processor cycles may be required to finish the instruction 210 (including the related writeback 212). An example of a long instruction may be a MULTIPLY instruction. If such a pairing of short instruction 202 and 204 may be arranged and executed in the execution unit 104, then the execution unit 106 may be able to execute a long instruction 210 in parallel. Due to the writeback buffer 110 there would be no conflict when writing back to the register file 108. In this case, the throughput of the processor 100 may be increased using the writeback buffer 110 in combination with the instruction pairing.

Figure 3A:
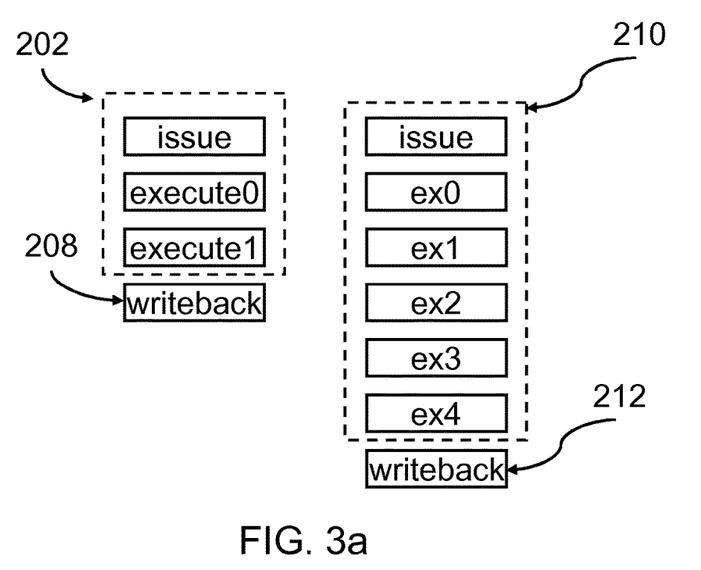
FIGS. 3a and 3b shows a short instruction and a long instruction with a potential writeback conflict.
Figure 3B:
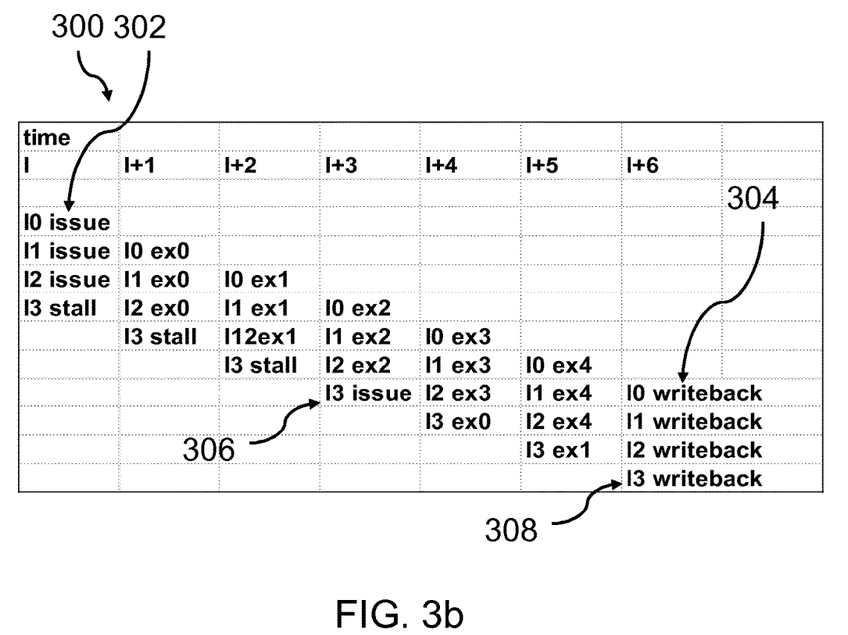

FIG. 3a shows a short instruction 202 and a long instruction 210 with a potential writeback conflict 300 (as illustrated in FIG. 3b) due to different latencies of the instructions. Such a problem may regularly occur without the mechanism described in the context of FIG. 2. Assume the time is running in a horizontal direction from I to I+1, I+2, ... I+6. Here, 'I' may represent subsequent instruction cycles of the processor. At time 'I', a long instruction 'I0' 210 may be issued 302. Each processor cycle to the right the long instruction 210 may be executed: I0 ex0, I0 ex1, I0 ex2, I0 ex2, I0 ex3, I0 ex4. At time I+6, the result of instruction 210 may be written back 304 to the register file 108. A second instruction, this time the short instruction 'I3' 202, may be issued at time I+3, denoted as "I3 issue", 306. Also the short instruction 202 may be executed cycle-by-cycle: I3 ex0, I3 ex1. At time I+6, the short instruction 202 would writeback 308 its result to the register file 108. The two writeback attempts 304 and 308 would, in this case, be in conflict. Typically, conventional technologies would delay instruction execution, i.e., issue one of the two instructions 202 and 210 later than the other to avoid the writeback conflict. Generally, the short instruction 202 would be delayed, resulting in limited throughput of the processor. In contrast, the disclosed techniques, as described in the context of FIG. 1 and FIG. 2, would address the delay dilemma.

Figure 4:
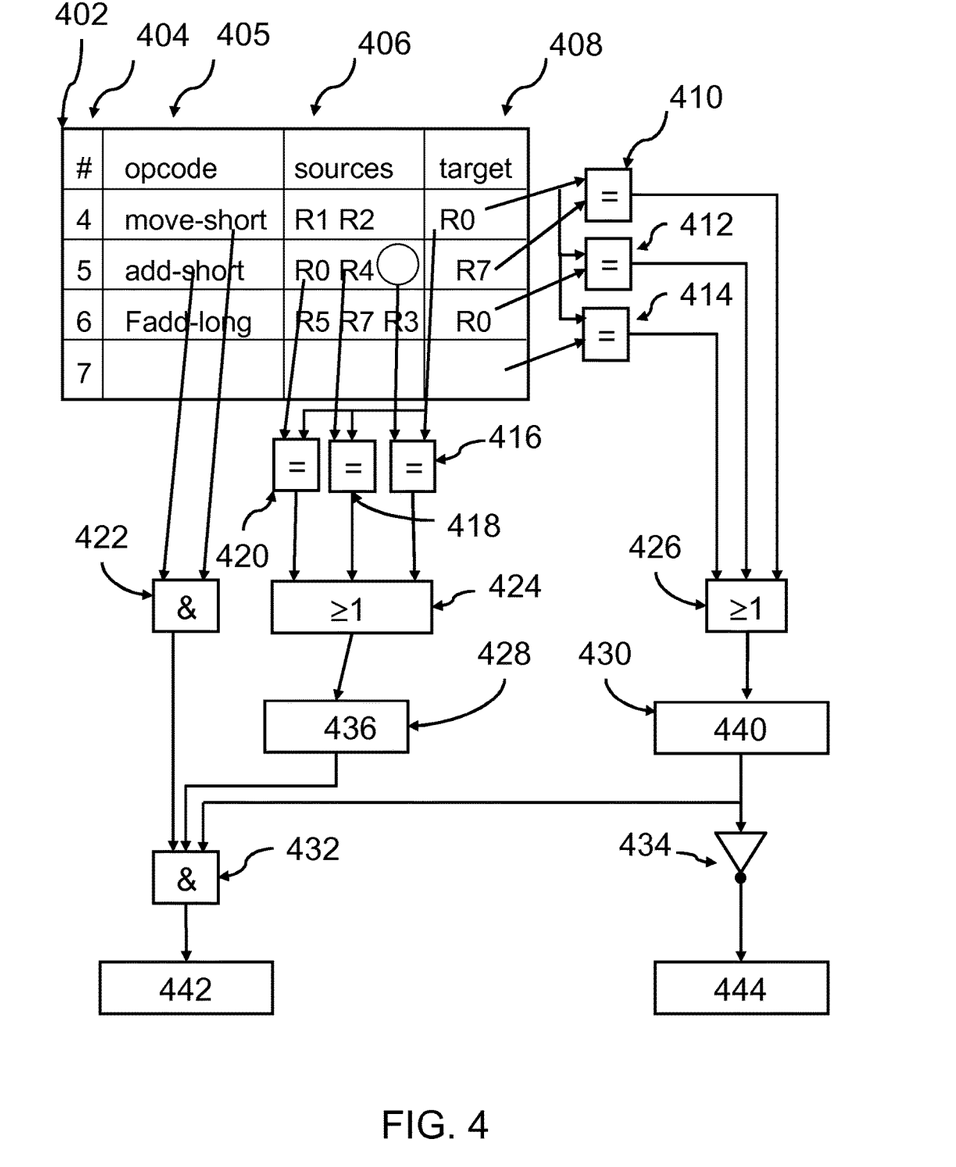
FIG. 4 shows an embodiment of a relevant portion of a scheduling unit.

FIG. 4 shows a relevant portion of a scheduling unit 402, which illustrates a small view into an instruction pipeline with entries No. #4, #5 and #6 (entries 404). Here, as an example, a format requiring an operational code 405, two source registers 406, and one target register 408 for the specific instructions of the instruction pipeline are used. Other instruction formats may be possible. It should be noted that in the instruction pipeline the instructions 405 may be in an order as generated by a compiler, e.g., as loaded from memory. Blocks 410, 412, and 414 may compare the target registers of related operations 405. For example, unit 410 may compare if the target registers of instruction 4 and 5 have identical target registers, and so on. As a result off the comparison a single line signal with potential values "0" or "1" (for true or false) of the comparison may be generated. Register R0 is written by the "move-short" instruction #4 with a result, which is used by the "add-short" instruction #5 and represents a source-target data dependency. Since instruction #6 (i.e., a Fadd-long instruction) will overwrite register R0 in the register file, the result from instruction #4 is only temporarily used as input to instruction #5 and obsolete after an issue of instruction #5.

In signals, the results of the comparing units 410, 412, and 414 may be used as input for the OR-unit 426. In case of a "1" as output from the OR-unit 426, it may be stated that register R0 as a result of instruction #4 has a limited lifetime because it is overwritten by instruction #6, which also has register R0 as target register. Thus, the output signal from OR-unit 426 may be used in an inverse form (compare 434) as an indicator signal 444 to writeback the result of instruction #4. An AND-unit 422 adds signals about the type of instruction, e.g., instruction #4 and #5 are both of the short latency type. Additionally, and starting from the result of the instruction #4, source registers R0 and R4 of the instruction #5 are compared in the units 416, 418, and 420. The output signals are OR-combined in unit 424. A true result of the OR function 424 may lead to the insight 436 that there is a data dependency between instructions #4 and #5, as instruction #5 needs the result from instruction #4 from register R0 as an input. An AND combination 432 of the signals from units 422, 424 and 440 leads to a result signal that instruction #4 and instruction #5 are a valid instruction pair. As such, the result signal may be used as pair detection logic 442. However, a combination of the other components 416, 418, 420, 422, 428, 432 may also be viewed as a pair detection logic.

Figure 5:
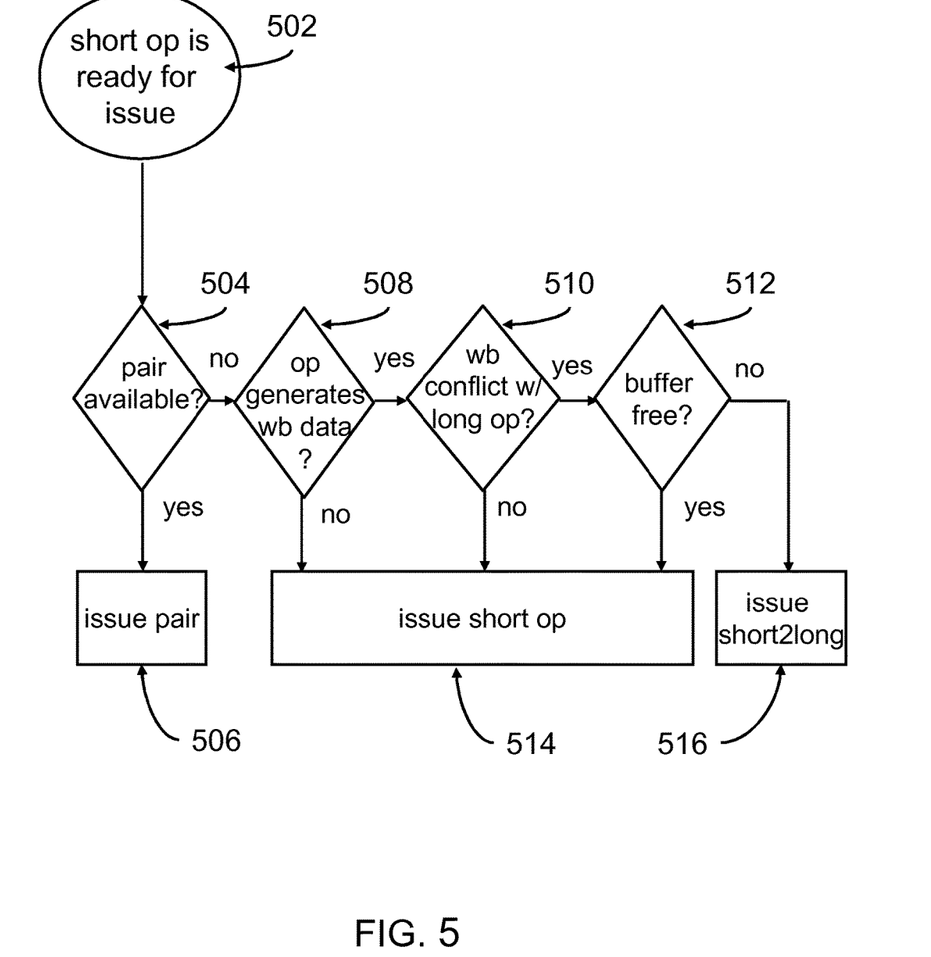
FIG. 5 shows a block diagram of a decision flow for issuing an instruction.

FIG. 5 shows a block diagram of a decision flow for issuing a short instruction, according to the present disclosure. At block 502, a short instruction (short op) is ready for issue. At block 504 a check is made as to whether a pair of short instructions may be built. Rules for building a pair of short instructions may include: locating two short instructions (e.g., short instructions 202 and 204) for which the total execution latency matches a latency of a long instruction (e.g., long instruction 210); determining a short living result is generated by the first short instruction; and determining whether a data dependency exists between the short instructions. An issue decision may include selecting the oldest short instruction and pairing the oldest short instruction with another short instruction, if available, in block 504. The instruction pair may then be issued in block 506. If a pair of short instructions is not available in block 504 control transfers to block 508.

If the short instruction does not generate a result that is required as a component of an architected state, the short instruction may never generate a writeback. In block 508, a determination is made as to whether the short instruction will generate a writeback. If the short instruction will not generate a writeback and, hence, no writeback conflict will occur, the short instruction may be issued in block 514. If the short instruction generates writeback data, control transfers from block 508 to block 510. If the short instruction generates writeback data, but does not conflict with a long instruction in block 510 control transfers to block 514 where the short instruction may be issued. If there is a writeback conflict with a long instruction in block 510 and a writeback buffer (e.g., writeback buffer 110) is available and free in block 512, the short instruction may be issued in block 514. If the writeback buffer is not available (e.g., already occupied) then a fallback to a conventional solution ("short2long") may be implemented in block 516. It should be appreciated that converting the short instruction into a long instruction increases latency. In this case, the short instruction may be inserted into the pipeline of the longer instruction. Conventionally, only the test in block 510 has been performed. It should be appreciated that the tests in blocks 504, 508, and 510 may be performed in a different sequence.

Figure 6:
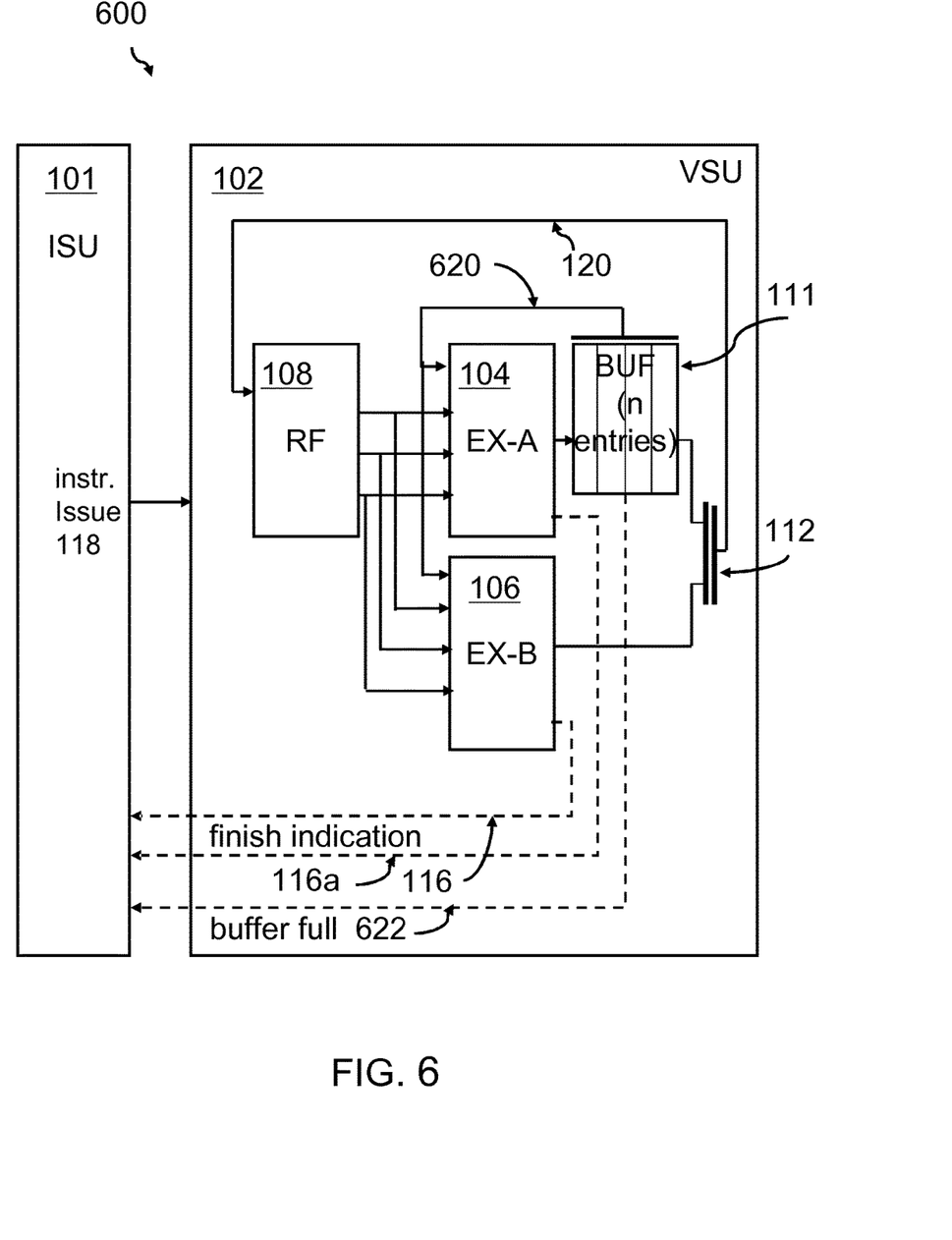
FIG. 6 shows a block diagram of an embodiment of an OoO processor that includes a writeback buffer with multiple entries.

FIG. 6 shows a block diagram of an embodiment of components 600 of an OoO processor comprising a writeback buffer 111 with multiple entries. A series of elements from FIG. 1 appear in FIG. 6 and, for brevity, are not be described again. At least three differences may be noted between FIGS. 1 and 6 (i.e., the writeback buffer 111 has more than one entry, e.g., 'n' entries, an additional forward line 620 is shown between the writeback buffer 111 and input ports of the execution unit 104 and the execution unit 106 (the writeback path 120 remains unchanged), and more than only one finish indication 116 goes back to the instruction scheduling unit 101). There may be un-multiplexed individual finish indications 116*a* and 116 from the execution unit 104 and the execution unit 106, respectively.

A buffer full indicator 622 may be implemented between the writeback buffer 111 and the instruction scheduling unit 101. Employing a buffer full indicator may allow (in contrast to the writeback buffer 110 with one entry (compare FIG. 1)) more complex and flexible writeback solutions. However, employing a buffer full indicator may imply additional communication between the instruction scheduling unit 101 and the execution units 104 and 06 via "buffer full" indicator lines and "finish" indications. For example, the writeback buffer 111 may include 'q' entries, where 'q' defines the communication latency, e.g., turn-around time between the execution unit 104 and the instruction scheduling unit 111. The concept is that an issue of a short instruction 202 may be delayed if no writeback buffer 111 entry is available. Since the buffer full indication 622 will influence the issue decision, the communication delay will define how many short instructions are issued before the buffer full indication 622 may prevent further issues of short instructions. The decision on issue will show a behaviour with hysteresis— only if at least q entries are available in the writeback buffer 111 the issue of short instructions 202, 204 may be restarted. Depending instructions, using any result stored in the writeback buffer 111, can be issued since the forwarding path 620 may also bypass results from the writeback buffer 111 via a content addressable memory (CAM).

Figure 7:
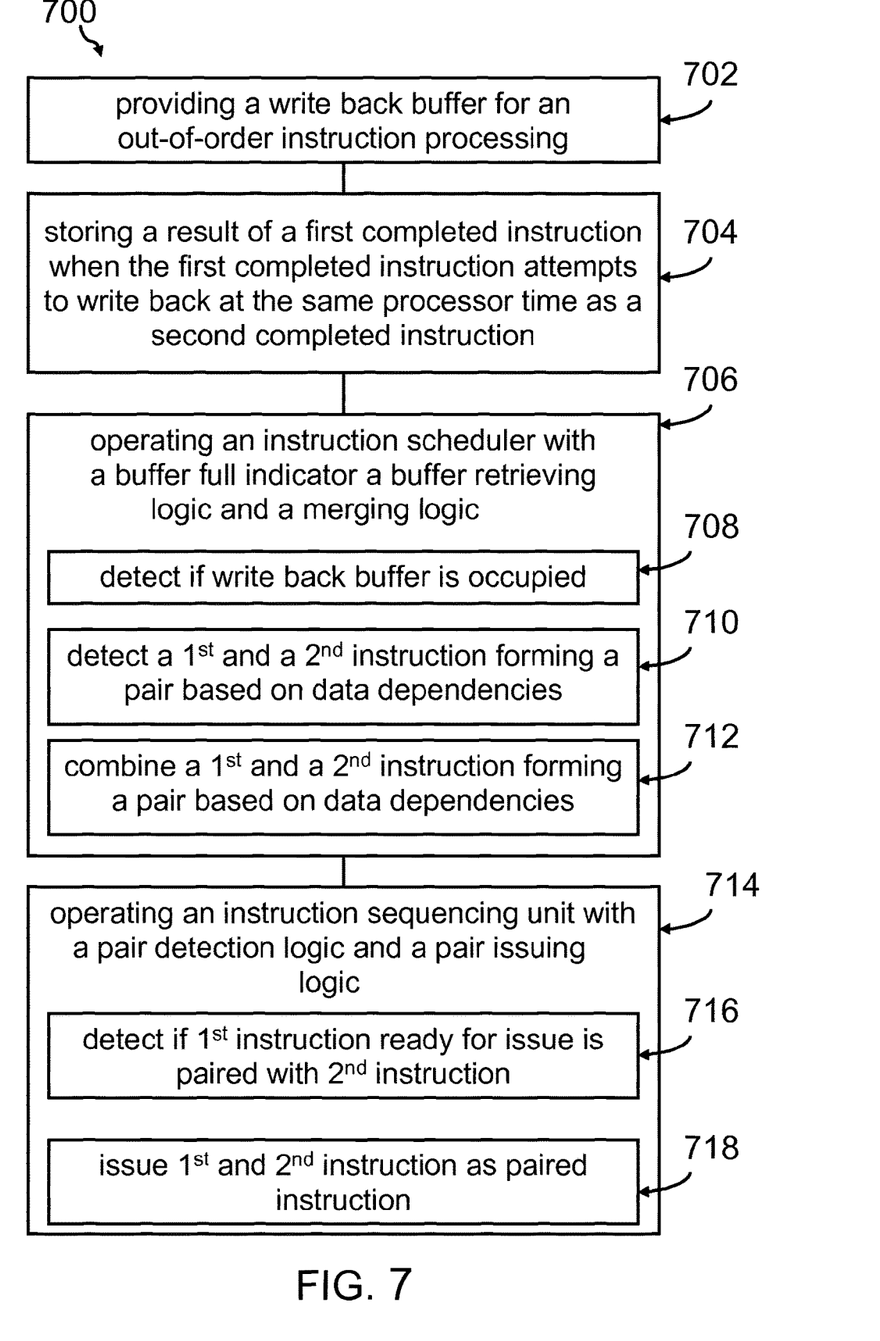
FIG. 7 shows a flowchart of a process for operating an out-of-order processor according to the present disclosure.

FIG. 7 shows an exemplary block diagram of a method to operate a processor 100 with out-of-order instruction processing according to the present disclosure. The method may comprise, providing, block 702, a writeback buffer 110 in a dataflow between an execution unit 104 and a register file 108 of the processor 100. The writeback buffer 110 may store, block 704, a result of a first completed instruction of the execution unit 104 when the first completed instruction attempts to writeback to the register file 108 at the same processor time as a second completed instruction of another execution unit 106. The method may also comprise operating, block 706, an instruction scheduling unit 101 comprising a buffer full indicator logic 622, a buffer retrieving logic, and a merging logic. The buffer full indicator logic 622 may detect, block 708, if the writeback buffer 110 is occupied. The buffer retrieving logic may writeback an execution unit instruction result from the writeback buffer 110 in response to a signal from the buffer full indicator logic 622. The merging logic may detect and combine, block 712, a first execution unit instruction of a processor instruction stream with a subsequent second execution unit instruction of the processor instruction stream to an instruction pair if the second execution unit instruction has an input data dependency to a result of the first execution unit instruction. For example, the merging logic may detect and instruction pair by inspecting younger execution unit instructions in the processor instruction stream than the first execution unit instruction that will overwrite a destination (target) register of the first execution unit instruction. Furthermore, the method may comprise operating an instruction sequencing unit, block 714, comprising a pair detection logic 442 and a pair issuing logic. The pair detection logic 442 may detect that the first execution unit instruction that is ready for issue may be paired with the second execution unit instruction. The pair issuing logic, responsive to a signal of the pair detection logic 442, may issue the first and the second execution unit instruction as paired execution unit instructions.

Accordingly, techniques have been disclosed herein for increasing instruction issue rate and reducing latency for an out-of-order processor by instruction chaining and collision avoidance.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of operating a processor, comprising:
   in response to a first execution unit of the processor attempting to write a first result of a first completed instruction to a register file of the processor at a same processor time as a second execution unit of the processor is attempting to write a second result of a second completed instruction to the register file, storing the first result to a writeback buffer of the processor, wherein the writeback buffer is positioned in a dataflow between the first execution unit and the register file;

detecting, using a buffer full indicator logic, that the writeback buffer is unavailable;
transmitting, from the buffer full indicator logic, a buffer unavailable signal in response to detecting the writeback buffer is unavailable;
in response to receiving the buffer unavailable signal at a buffer retrieving logic, writing, using the buffer retrieving logic, the first result from the writeback buffer to the register file;
inspect, using merging logic, younger execution unit instructions in a processor instruction stream than a first execution unit instruction that will overwrite a target register of the first execution unit instruction;
combine, by the merging logic, the first execution unit instruction of the processor instruction stream with a subsequent second execution unit instruction of the processor instruction stream into an instruction pair if the second execution unit instruction has an input data dependency to a result of the first execution unit instruction;
detect, using pair detection logic, that the first execution unit instruction, which is ready for issue, is paired with the second execution unit instruction; and
responsive to a signal of the pair detection logic indicating a detection that the first execution unit instruction is paired with the second execution unit instruction, issuing, by pair issuing logic, the first and the second execution unit instructions as paired execution unit instructions.

2. The method of claim 1, wherein the first execution unit and the second unit are of different types.

3. The method of claim 1, further comprising:
receiving at a first input of a multiplexer an output of the writeback buffer;
receiving at a second input of the multiplexer an output of the second execution unit; and
selecting one of the first and second inputs at an output of the multiplexer, wherein the output of the multiplexer is coupled to an input of the register file.

4. The method of claim 1, wherein the writeback buffer has multiple entries.

5. The method of claim 4, wherein the multiple entries are organized as a first-in-first-out buffer or as a ring buffer.

6. The method of claim 4, further comprising:
invalidating selected ones of the multiple entries based on receipt a flush signal.

7. The method of claim 1, wherein the first completed instruction is included in an instruction pair and the method further comprises:
combining a first short instruction of the first execution unit with a subsequent second short instruction of the first execution unit to create the instruction pair if an execution result of the first short instruction is not required in an architectural state of the processor after the second short instruction is completed and the second short instruction has data dependency on the first short instruction.

8. The method of claim 7, wherein a combined total latency of the first and second short instructions is equal to a latency of the second completed instruction which is a long instruction of the processor.

9. A data processing system, comprising:
a memory; and
a processor coupled to the memory, wherein the processor is configured to:
in response to a first execution unit of the processor attempting to write a first result of a first completed instruction to a register file of the processor at a same processor time as a second execution unit of the processor is attempting to write a second result of a second completed instruction to the register file, store the first result to a writeback buffer of the processor, wherein the writeback buffer is positioned in a dataflow between the first execution unit and the register file;
detect, using a buffer full indicator logic, that the writeback buffer is unavailable;
transmit, from the buffer full indicator logic, a buffer unavailable signal in response to detecting the writeback buffer is unavailable;
in response to receiving the buffer unavailable signal at a buffer retrieving logic, write, using the buffer retrieving logic, the first result from the writeback buffer to the register file;
inspect, using merging logic, younger execution unit instructions in a processor instruction stream than a first execution unit instruction that will overwrite a target register of the first execution unit instruction;
combine, by the merging logic, the first execution unit instruction of the processor instruction stream with a subsequent second execution unit instruction of the processor instruction stream into an instruction pair if the second execution unit instruction has an input data dependency to a result of the first execution unit instruction;
detect, using pair detection logic, that the first execution unit instruction, which is ready for issue, is paired with the second execution unit instruction; and
responsive to a signal of the pair detection logic indicating a detection that the first execution unit instruction is paired with the second execution unit instruction, issuing, by pair issuing logic, the first and the second execution unit instructions as paired execution unit instructions.

10. A processor, comprising:
a first execution unit;
a register file;
a second execution unit coupled to the register file;
a writeback buffer coupled between the first execution unit and the register file, wherein the writeback buffer is adapted to store a first result of a first completed instruction of the first execution unit in response to the first execution unit attempting to write the first result of the first completed instruction to the register file at a same processor time as the second execution unit is attempting to write a second result of a second completed instruction to the register file;
an instruction scheduling unit comprising a buffer full indicator logic, a buffer retrieving logic, and a merging logic, wherein the buffer full indicator logic is adapted to detect that the writeback buffer is unavailable, the buffer retrieving logic is adapted to writeback an execution unit instruction result from the writeback buffer to the register file of the processor in response to a signal from the buffer full indicator logic, and the merging logic is adapted to detect, by inspecting younger execution unit instructions in a processor instruction stream than a first execution unit instruction that will overwrite a target register of the first execution unit instruction, and combine the first execution unit instruction of the processor instruction stream with a subsequent second execution unit instruction of the processor instruction stream into an instruction pair if the second execution unit instruction has an input data dependency to a result of the first execution unit instruction, and an instruction sequencing unit comprising a pair detection logic and a pair issuing logic, wherein the pair detection logic is adapted to detect that the first execution unit instruction, which is ready for issue, is paired with the second execution unit instruction, and wherein the pair issuing logic is adapted, responsive to a signal of the pair detection logic, to issue the first and the second execution unit instructions as paired execution unit instructions.

11. The processor of claim 10, wherein the execution units are of different types.

12. The processor of claim 11, wherein the different types include floating point units and arithmetic logic units.

13. The processor of claim 10, further comprising a multiplexer coupled between the writeback buffer and the register file and the second execution unit and the register file.

14. The processor of claim 10, wherein the writeback buffer has multiple entries.

15. The processor of claim 14, wherein the multiple entries are organized as a first-in-first-out buffer.

16. The processor of claim 14, wherein the multiple entries are organized as a ring buffer.

17. The processor of claim 14, wherein the writeback buffer is adapted to invalidate selected ones of the multiple entries based on a flush signal.

18. The processor of claim 10, wherein the merging logic is further adapted to combine the first execution unit instruction with the subsequent second execution unit instruction into the instruction pair if the result of the first execution unit instruction does not appear as an architectural state of the processor after the second execution unit instruction is completed.

19. The processor of claim 10, wherein the first and second execution unit instructions are both short instructions of the processor, and wherein a combined total latency of the first and second execution unit instructions match a latency of a long instruction of the processor that corresponds to the second completed instruction.

* * * * *